June 18, 1929.  F. W. PROVINCE ET AL  1,718,181
FISHWAY
Filed March 23, 1927    2 Sheets-Sheet 2
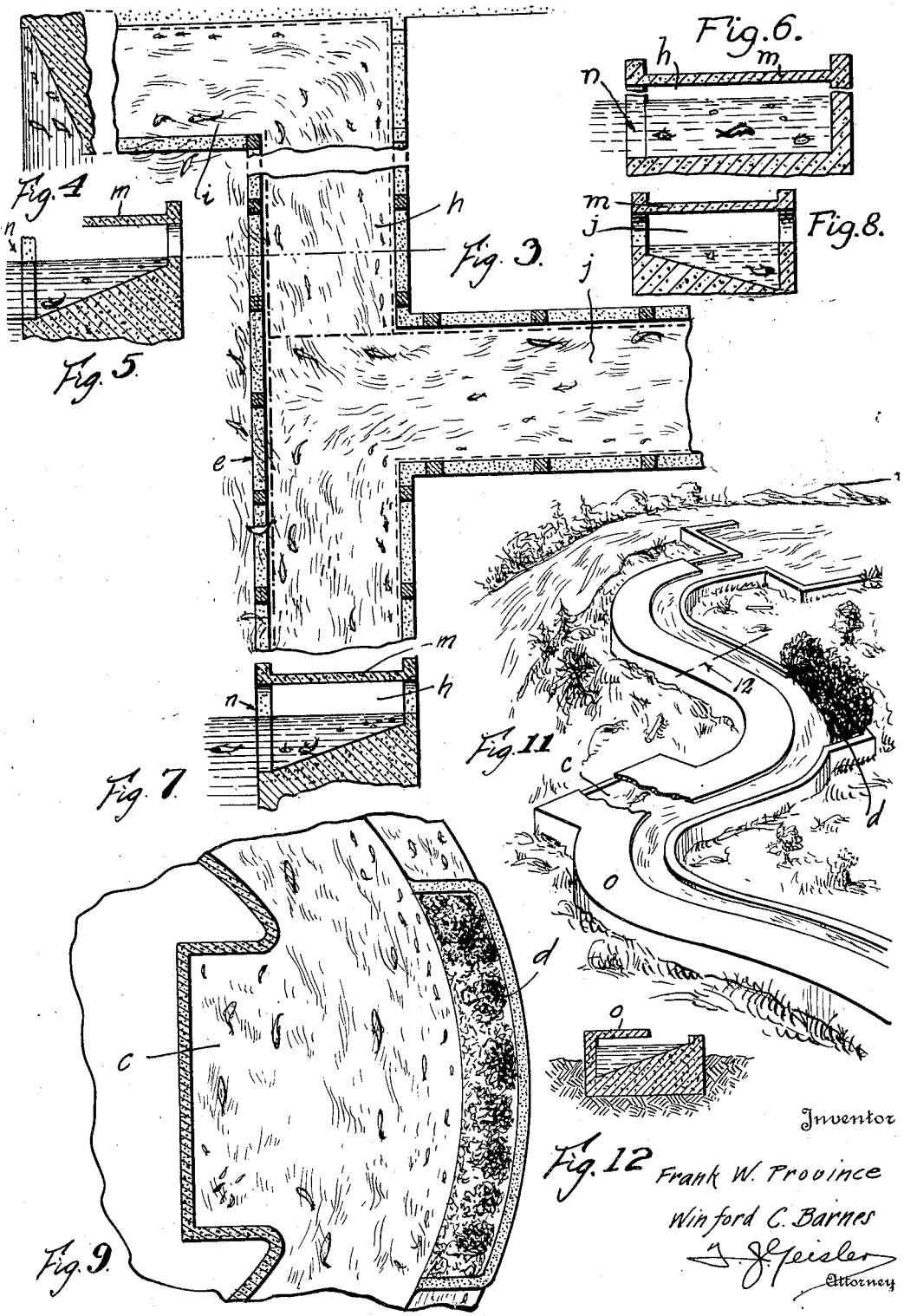
Inventor
Frank W. Province
Winford C. Barnes Patented June 18, 1929.

1,718,181

UNITED STATES PATENT OFFICE.

FRANK W. PROVINCE AND WINFORD C. BARNES, OF CAMAS, WASHINGTON.

FISHWAY.

Application filed March 23, 1927. Serial No. 177,634.

Our invention relates to "fish ladders" or "fish-ways" located at dams to enable the fish to get to spawning grounds located above the dam.

The difficulty with artificial fish-ways heretofore has been that no consideration was given to the travel of the small fish down stream.

The object of our invention is to simulate the fish-way provided by nature; namely, the creek descending down a hill or mountain. In short, we propose to provide a narrow stream of water flowing on a winding or zig-zag course, and having a gradual fall from a higher to a lower level. Also, to simulate nature by providing deep and shallow places in the cross section of the stream, so that the larger fish may swim in the deeper portions while traveling up stream to the spawning grounds, and the smaller fish may safely travel down the stream in the shallow portions.

It is further our purpose to simulate nature in providing a stream of water having a rate of flow similar to a mountain creek; such being accomplished by giving our fish-way a gradual grade; also we keep the flowing waters cool by protecting its surface from the sun's rays; also provide pools along the course of our fish-way in which the fish may rest.

Our invention is especially applicable in order to provide an artificial creek, as it were, leading from a lower to an upper surface, where the head-waters are impounded by a dam to provide water power.

These objects of our invention are attained by the building of a winding flume of angular cross-section, with the floor of the flume inclined preferably inward so as to carry the deepest water on the interior side of the flume, and the water becoming more and more shallow towards, and finally tending to spill over, the outer side of the flume, in that way keeping the flowing water cool.

Further, the floor of the upper sections of the flume, is arranged to project and overhang the flume sections disposed at a lower level, thereby to protect one side of the flume from the sun's rays, thus keeping the water cool. The flume is further constructed to provide pools along its course in which the fish may swim about and rest on the way, as already mentioned.

These features are incidental details of the construction of our fish-way, and the arrangement of its parts, we have illustrated in the accompanying drawings, in which:

Fig. 3 shows a partial plan section of the upper level of our fish-way where it connects with the top of the adjacent dam; the section being taken just below the deck covering, the bridge connecting the upper level of our fish run-way with the top of the dam;

Figs. 4 to 8 show cross-sections of those portions of the water run-way with which these figures are connected by dotted lines respectively;

Fig. 9 illustrates the arrangement of certain portions of the flume so as to provide a pool and resting place for the fish along the course;

Fig. 11 illustrates our fish-way built in the form of a zig-zag course; and

Fig. 12 shows a cross-section at the point 12 of Fig. 11.

Figure 1:
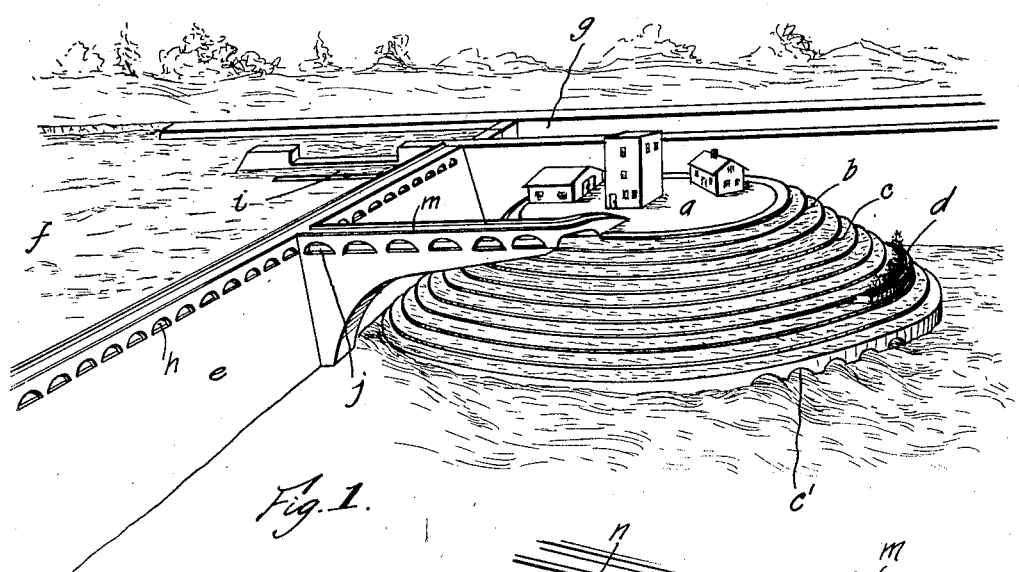
Fig. 1 shows in diagrammatic perspective, our fish-way located just below the dam impounding the head waters of a river, adjacent a lock; our fish-way being constructed to serve at the same time as a power station.

Preferably, we construct the supporting base of our fish-way in the form of a cone, as shown in Fig. 1, but this is a mere matter of preference, which may be followed or not, as deemed best by the builder of our invention.

The essential features of our fish-way are that a structure $a$ be provided formed with a winding flume $b$ about its periphery, having a gradual rise from the lower to the upper levels.

The floor of the flume is sloped transversely preferably inwardly, whereby the body of water carried by the flume will have its greatest depth at the inner side of the flume and thus accommodate the larger fish, and the floor will thence taper towards the outer side of the flume, and as a result provide more shallow waters adjacent the outer side of the flume for the smaller fish, which in that way are protected from their natural enemies, the larger fish, since the latter cannot enter the more shallow waters.

Figure 2:
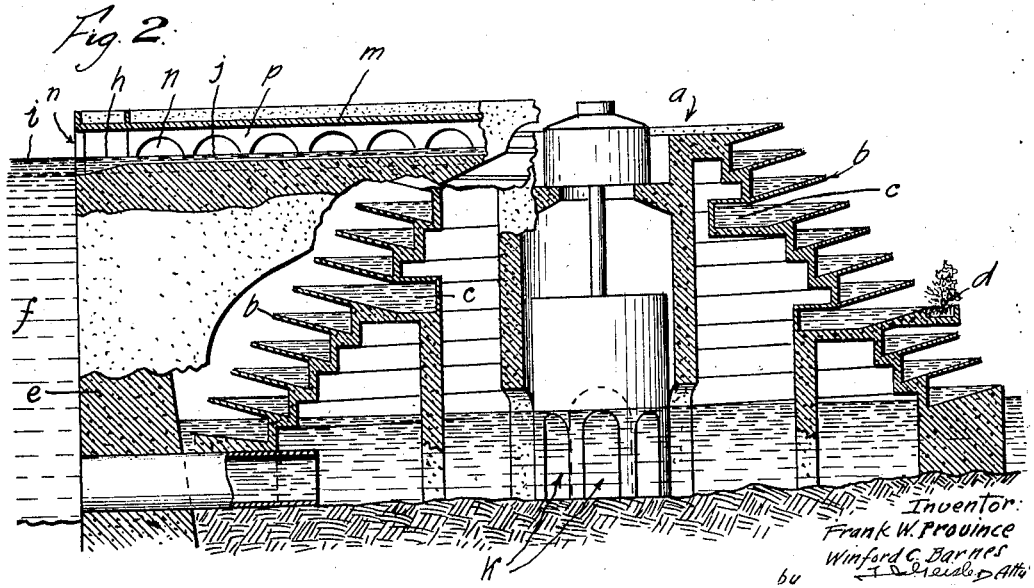
Fig. 2 shows a central section in a vertical plane parallel with the dam.

This construction is illustrated by Fig. 2.

Preferably, the depth of the flume is so arranged, relatively to the amount of water which courses through it, that the water tends to overflow the rim of the outer side of the flume in that way tending to keep the waters of the flume cool.

Furthermore, the upper courses of the flume are arranged so as to project over and overhang the lower courses as also illustrated by Fig. 2, thereby to shade the waters at the inner side of the flume from the rays of the sun, and thus help to keep the waters cool.

In order to simulate the shady places along the course of the mountain creek, where running under overhanging branches of trees and shrubs, these outer sides of the flume may be provided with pockets to hold earth and vegetation planted therein as illustrated at *d*, in Figs. 1, 2 and 9.

In order to provide resting pools along the course of our flume, it is provided with enlargements as illustrated by *c* in Fig. 2, and by the enlarged fragmentary plan section of our flume, Fig. 9.

In Fig. 1 our fish-way is illustrated as being installed adjacent a dam *e* impounding the waters *f*. It is assumed that these waters are connected by means of a lock *g* with the waters at the lower portion of the stream.

At the top of the dam is provided a water run-way *h*, extending to the wall of the lock *i*, and a branch *j* of the run-way *h* connects the top of the dam with the uppermost course of our fish-way *b*.

These water-run-ways are also so arranged so as to contain waters of varying depth, thus accommodating larger fish, and providing shallower water in which the smaller fish may seek refuge in coming down stream. To this end the floors of the said run-ways are also sloped in cross-section similar to the construction above decribed of our flume. These details being illustrated by the cross-sectional views 5 to 8 inclusive. In this connection it will be noted that at the cross-section represented by Fig. 6, the water run-way has uniform depth which is unavoidable under the circumstances, but since this uniform depth extends for only a short distance the smaller fish, by watching their opportunity will be able to get across when not menaced by the proximity of larger fish.

Figure 10:
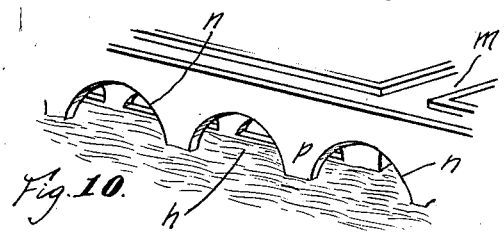
Fig. 10 shows a fragment of the far side of the dam and illustrates a detail of construction.

As illustrated by Fig. 10, the openings *n* between the arches *p* at the top of the dam, on its far side, extend down to the bottom of the floor, so that the big fish can swim out to deep water through these openings.

In order to shade the run-way of the dam and the connecting bridge *j* therefrom to the uppermost course of our fish-way, the run-ways may be decked by a road-way *m*, which at the same time would facilitate travel from our fish-way to and over the dam to the adjacent shore.

Our fish-way structure may be so built as to house turbines for converting water-power into electric power, such use of our fish-way being diagrammatically illustrated by Figs. 1 and 2. When our fish-way is intended for housing a power plant, it will, of course, be hollow, and the water will flow through the tube *t* to the turbines and will be discharged through outlets *k* in the base of the structure.

The top of our structure may also be used to great advantage as a fish hatchery.

Referring now to Figs. 11 and 12, these merely illustrate another manner in which our invention may be carried into practice.

The details are the same, and thus the arrangement of the cross section of the floor of the flume, the resting pools, and the pockets to contain earth for bushes and plants are indicated by the same reference characters as used in describing the conical type of structure. But if an overhanging shadow-producing effect is desired one wall of the flume must be constructed as indicated by *o* in Figures 11 and 12.

We claim:

1. A fish-way comprising a structure formed with a winding flume having a gradual rise from the lower to the upper levels and the floor of the flume sloping transversely whereby the body of water carried by the flume will have its greatest depth at one side of the flume to accommodate the larger fish, and becomes more and more shallow towards the other side of the flume.

2. A fish-way comprising a structure formed with a winding flume having a gradual rise from the lower to the upper levels, the floor of the flume sloping transversely whereby the body of water carried by the flume will have its greatest depth at one side of the flume to accommodate the larger fish, and becomes more and more shallow towards the other side of the flume, the upper courses being spaced from the lower by intermediate wall sections, and the floors of the upper courses of the flume projecting and overhanging the lower courses thereby to shade the latter.

3. A fish-way comprising a structure formed with a winding flume having a gradual rise from the lower to the upper levels, the floor of the flume sloping transversely whereby the body of water carried by the flume will have its greatest depth at one side of the flume to accommodate the larger fish, and becomes more and more shallow towards the other side of the flume, and the flume being provided with enlargements constituting resting pools along its course.

4. A fish-way comprising a structure formed with a winding flume having a gradual rise from the lower to the upper levels, the floor of the flume sloping transversely whereby the body of water carried by the flume will have its greatest depth at one side of the flume to accommodate the larger fish, and becomes more and more shallow towards the other side of the flume, the upper courses being spaced from the lower by intermediate wall sections, and the floors of the upper courses of the flume projecting and overhanging the lower courses thereby to shade the latter, and the flume being provided with enlargements constituting resting pools along its course.

5. A fish-way comprising a conical structure arranged to provide a flume winding about the perimeter of the structure and having a gradual rise from the lower to the upper levels.

6. A fish-way comprising a conical structure arranged to provide a flume winding about the perimeter of the structure having a gradual rise from the lower to the upper levels and the floor of the flume sloping transversely, whereby the body of water carried by the flume will have its greatest depth at one side of the flume to accommodate the larger fish, and becomes more and more shallow towards the outer side of the flume.

7. In combination with a dam a fish-way leading to the head waters above the dam, said fish-way comprising a structure formed with a winding flume having a gradual rise from the lower to the upper levels, the dam provided with a water run-way at the top and a branch run-way therefrom connecting with the uppermost course of said flume.

8. In combination with a dam, a fish-way leading to the head waters above the dam, said fish-way comprising a structure formed with a winding flume having a gradual rise from the lower to the upper levels, the floor of the flume sloping transversely whereby the body of water carried by the flume will have its greatest depth at one side of the flume to accommodate the larger fish, and becomes more and more shallow towards the other side of the flume, the dam provided with a water run-way at the top and a branch run-way therefrom connecting with the uppermost course of said flume and said water run-ways also arranged in transverse section like said flume for the purpose described.

9. A fish-way comprising a structure comprising a winding wall provided with laterally projecting continuous troughs gradually rising from the lower to the upper levels, the troughs of the upper levels overhanging those of the lower, thereby to shade the latter.

FRANK W. PROVINCE.
WINFORD C. BARNES.